United States Patent
Zhu et al.

(10) Patent No.: US 11,707,724 B2
(45) Date of Patent: Jul. 25, 2023

(54) PREPARATION METHOD OF BACTERIAL CELLULOSE-DEFECTIVE MOLYBDENUM DISULFIDE HETEROJUNCTION MATERIAL FOR TREATING RADIOACTIVE WASTEWATER

(71) Applicant: Southwest University of Science and Technology, Mianyang (CN)

(72) Inventors: Wenkun Zhu, Mianyang (CN); Tao Chen, Wuhu (CN); Rong He, Hefei (CN); Fan Yang, Mianyang (CN); Yun Dong, Chengdu (CN); Qian Wang, Mianyang (CN); Bo Liu, Mianyang (CN); Rong Wang, Mianyang (CN)

(73) Assignee: Southwest University of Science and Technology, Mianyang (CN)

( * ) Notice: Subject to any disclaimer, the term of this patent is extended or adjusted under 35 U.S.C. 154(b) by 329 days.

(21) Appl. No.: 17/190,407

(22) Filed: Mar. 3, 2021

(65) Prior Publication Data
US 2022/0032262 A1 Feb. 3, 2022

(30) Foreign Application Priority Data
Jul. 31, 2020 (CN) .......................... 202010756961.0

(51) Int. Cl.
*B01J 20/02* (2006.01)
*B01J 20/20* (2006.01)
(Continued)

(52) U.S. Cl.
CPC ....... *B01J 20/0266* (2013.01); *B01J 20/0218* (2013.01); *B01J 20/20* (2013.01);
(Continued)

(58) Field of Classification Search
CPC .... B01J 20/0266; B01J 20/0218; B01J 20/20; B01J 20/3021; B01J 20/3078;
(Continued)

(56) References Cited

U.S. PATENT DOCUMENTS

2019/0247793 A1* 8/2019 Singamaneni ....... B01D 69/148

FOREIGN PATENT DOCUMENTS

CN 110052260 A * 7/2019

OTHER PUBLICATIONS

English Translation of CN110052260 (Year: 2019).*

* cited by examiner

*Primary Examiner* — Andrew J. Oyer
(74) *Attorney, Agent, or Firm* — Bayramoglu Law Offices LLC (57) ABSTRACT

A preparation method of a bacterial cellulose-defective molybdenum disulfide (BC-MoS$_{2-x}$) heterojunction material for treating radioactive wastewater is provided, including: preparing bacterial cellulose by the in situ growth technology of *Acetobacter xylinum*, and freeze-drying to obtain dried bacterial cellulose; carbonizing the dried bacterial cellulose to obtain carbonized bacterial cellulose; dispersing the carbonized bacterial cellulose into deionized water under an ultrasonic treatment; then adding thiourea and Na$_2$MoO$_4$·2H$_2$O, dissolving under an ultrasonic treatment to obtain a reaction mixture, subjecting the reaction mixture to a hydrothermal reaction to obtain a BC-MoS$_2$ heterojunction; and calcining the BC-MoS$_2$ heterojunction in a tube furnace with an Ar/H$_2$ atmosphere to obtain the BC-MoS$_{2-x}$ heterojunction.

7 Claims, 9 Drawing Sheets

(51) Int. Cl.
   *B01J 20/30* (2006.01)
   *G21F 9/12* (2006.01)
(52) U.S. Cl.
   CPC ....... *B01J 20/3021* (2013.01); *B01J 20/3078* (2013.01); *B01J 20/3085* (2013.01); *G21F 9/12* (2013.01)
(58) Field of Classification Search
   CPC .. B01J 20/3085; B01J 20/0285; B01J 27/051; B01J 35/004; G21F 9/12; G21F 9/06; G21F 9/20; C02F 1/30; C02F 2101/006; C02F 2305/10; C02F 1/283; C02F 1/70; Y02W 10/37
   See application file for complete search history.

PREPARATION METHOD OF BACTERIAL CELLULOSE-DEFECTIVE MOLYBDENUM DISULFIDE HETEROJUNCTION MATERIAL FOR TREATING RADIOACTIVE WASTEWATER

CROSS REFERENCE TO THE RELATED APPLICATIONS

This application is based upon and claims priority to Chinese Patent Application No. 202010756961.0, filed on Jul. 31, 2020, the entire contents of which are incorporated herein by reference.

TECHNICAL FIELD

The present invention relates to the field of environmental remediation, and more particularly, to a preparation method of a bacterial cellulose-defective molybdenum disulfide heterojunction material for treating radioactive wastewater.

BACKGROUND

Nuclear energy is a promising resource capable of meeting growing energy demands. The utilization of nuclear energy will inevitably produce substantial amounts of radioactive wastewater, which will damage the surrounding ecological environment. As a widely existing radionuclide in radioactive wastewater, dissolved hexavalent uranium (U(VI)) has strong radioactivity, long half-life and strong chemical and radioactive toxicity. Therefore, it is essential to explore efficient and eco-friendly U(VI) extraction technology for the sustainable development of nuclear energy and environmental protection.

Relevant studies have shown that the reduction of soluble and environmentally mobile U(VI) to tetravalent U (IV) with low solubility and relative immobility is considered to be one of the promising strategies to achieve the U(VI) extraction. Although various semiconductor photocatalysts, such as $g-C_3N_4$ and $TiO_2$, have been studied as candidates for the U(VI) extraction, single semiconductor usually undergoes recombination of electrons and holes, resulting in low photocatalytic activity. Additionally, the accumulation of U(VI) reduction products at the limited active sites on semiconductors seriously hinders the continuous reduction of U(VI). An effective way to avoid the recombination of electrons and holes on the photocatalyst is to construct a heterojunction with Schottky junction contact. The construction of heterojunction effectively promotes the transfer of photoelectrons from semiconductors to adsorbents, thus providing abundant adsorption sites for the photocatalytic reduction of U(VI). Similar to the construction of heterojunction, the improvement of charge carrier separation efficiency typically comes from the trap state of the semiconductor, which can be achieved simply by introducing vacancies. Therefore, the integration of Schottky junction and vacancies provides a good strategy for electron transfer and charge carrier separation, thereby improving the extraction performance of U(VI).

In the present invention, a bacterial cellulose-defective molybdenum disulfide ($BC-MoS_{2-x}$) heterojunction for U(VI) extraction is developed by integrating Schottky junction and sulfur vacancy. The carbonized bacterial cellulose not only serves as a confined framework for the growth of $MoS_2$, but also functions as an ideal electron acceptor and transporter for improving the charge carrier separation efficiency. In the $BC-MoS_{2-x}$ heterojunction, the electrons in $MoS_{2-x}$ are transferred into the carbonized bacterial cellulose because the Fermi level of the $MoS_{2-x}$ is higher than that of the carbonized bacterial cellulose, which enables the continuous U(VI) extraction.

SUMMARY

One objective of the present invention is at least to solve the above problems and/or deficiencies and to provide the advantages to be described later.

In order to achieve the objective and advantages, the present invention provides a preparation method of a bacterial cellulose-defective molybdenum disulfide ($BC-MoS_{2-x}$) heterojunction material for treating radioactive wastewater, including the following steps:

step 1: preparing a liquid culture medium (per 150 mL) by dissolving and evenly mixing 5 wt % D-glucose, 0.5 wt % yeast extract, 0.2 wt % disodium hydrogen phosphate, 0.5 wt % peptone, 0.1 wt % citric acid, 0.1 wt % potassium dihydrogen phosphate and water, adjusting a pH value to 6.8, and performing a sterilization under a vapor pressure of 103.4 kPa and a temperature of 120-121.3° C. for 15-20 min; inoculating *Acetobacter xylinum* in the liquid culture medium and placing in a constant temperature incubator, incubating for 7 days at 293 K with a shaking speed of 120 rpm, and then rinsing to neutral with deionized water; performing a freeze-drying to obtain dried bacterial cellulose; in which the *Acetobacter xylinum* is inoculated in the liquid culture medium according to a volume fraction of 3-8%;

step 2: placing the dried bacterial cellulose in a tube furnace with a nitrogen/argon protective atmosphere, heating to 750-850° C. at a rate of 5° C./min, and keeping at 750-850° C. for 2-3 h to obtain carbonized bacterial cellulose;

step 3: dispersing the carbonized bacterial cellulose into deionized water under an ultrasonic treatment; adding thiourea and $Na_2MoO_4 \cdot 2H_2O$, dissolving under the ultrasonic treatment to obtain a reaction mixture, transferring the reaction mixture into a Teflon-lined stainless steel autoclave, and conducing a heat preservation at 140-230° C. for 12 h; cooling naturally, and collecting a bacterial cellulose-$MoS_2$ ($BC-MoS_2$) heterojunction by a centrifugation;

step 4: placing the $BC-MoS_2$ heterojunction in a tube furnace with an $Ar/H_2$ atmosphere, heating to 300° C. at a rate of 5-10° C./min, keeping at 300° C. for 0-200 min, and cooling naturally to obtain the $BC-MoS_{2-x}$ heterojunction, where $0 \leq X \leq 2$, the value of X is controlled by changing the heat preservation time in $Ar/H_2$ to form an S vacancy.

Preferably, in step 3, a mass ratio of the carbonized bacterial cellulose to the deionized water is 1:600-800, a mass ratio of the carbonized bacterial cellulose to the thiourea is 1:0.3-0.4, and a mass ratio of the thiourea to the $Na_2MoO_4 \cdot 2H_2O$ is 1:14-17.

Preferably, in step 2, the carbonized bacterial cellulose is subjected to a pretreatment as follows: laying the carbonized bacterial cellulose on a bottom plate of a low-temperature plasma generator with a thickness of 6-12 mm; adjusting a spacing between two plates of the low-temperature plasma generator to 25-65 mm; controlling an internal air pressure of the low-temperature plasma generator to 900-1,200 Pa, then introducing a gas into the low-temperature plasma generator; adjusting a working voltage and current between the two plates of the low-temperature plasma generator to 50-220 V and 0.5-1.2 A, respectively, and treating for 30-60 min to obtain pretreated carbonized bacterial cellulose.

Preferably, the gas is one selected from the group consisting of air, oxygen and carbon dioxide.

Preferably, step 3 may be replaced by the following step: adding the carbonized bacterial cellulose into a ball mill, and adding thiourea and $Na_2MoO_4 \cdot 2H_2O$ simultaneously; introducing liquid nitrogen into the ball mill to immerse all the materials in the liquid nitrogen, and keeping a liquid level stable; preforming a ball milling after keeping at a constant temperature for 15-30 min, in which the temperature in the ball mill is −155° C. to −180° C.; placing the milled materials at 40-60° C. for 90-120 min; dispersing the milled materials into deionized water under an ultrasonic treatment to obtain a reaction mixture, transferring the reaction mixture into a Teflon-lined stainless steel autoclave, and conducting a heat preservation at 140-230° C. for 12 h; cooling naturally, and collecting the $BC-MoS_2$ heterojunction by a centrifugation.

Preferably, a time of the ball milling is 60-90 min, and a speed of the ball milling is 500-650 rpm.

Preferably, in step 3, a mass ratio of the carbonized bacterial cellulose to the deionized water is 1:600-800, a mass ratio of the carbonized bacterial cellulose to the thiourea is 1:0.3-0.4, and a mass ratio of the thiourea to the $Na_2MoO_4 \cdot 2H_2O$ is 1:14-17.

The present invention at least includes the following advantages: the defective molybdenum disulfide (S vacancy)/bacterial cellulose hybrid material prepared by the present invention can selectively adsorb U(VI) and be used for photocatalytic reduction of U(VI) simultaneously under simulated sunlight; the bacterial cellulose not only serves as a confined framework for the growth of $MoS_2$, but also functions as an ideal electron acceptor and transporter for improving the charge carrier separation efficiency, thereby greatly enhancing the photocatalytic reduction ability of U(VI) extraction.

Other advantages, objectives and features of the present invention will be embodied in part by the following description, and will be understood in part by those skilled in the art through the research and implementation of the present invention.

DETAILED DESCRIPTION OF THE EMBODIMENTS

The present invention is further described in detail in combination with the drawings, so that those skilled in the art can implement it with reference to the specification.

It is to be understood that terms such as "have", "include" and "contain" as used herein do not imply the presence or addition of one or more other elements or combinations thereof.

Embodiment 1

A preparation method of a bacterial cellulose-defective molybdenum disulfide ($BC-MoS_{2-x}$) heterojunction material for treating radioactive wastewater includes the following steps.

Step 1: a liquid culture medium (per 150 mL) is prepared by dissolving and evenly mixing 5 wt % D-glucose, 0.5 wt % yeast extract, 0.2 wt % disodium hydrogen phosphate, 0.5 wt % peptone, 0.1 wt % citric acid, 0.1 wt % potassium dihydrogen phosphate and water, adjusting a pH value to 6.8, and performing a sterilization under a vapor pressure of 103.4 kPa and a temperature of 120° C. for 20 min.

Acetobacter xylinum is inoculated in the liquid culture medium and placed in a constant temperature incubator, incubated for 7 days at 293 K with a shaking speed of 120 rpm, and then rinsed to neutral with deionized water. A freeze-drying is performed to obtain dried bacterial cellulose. The Acetobacter xylinum is inoculated in the liquid culture medium according to a volume fraction of 5%.

Figure 3:
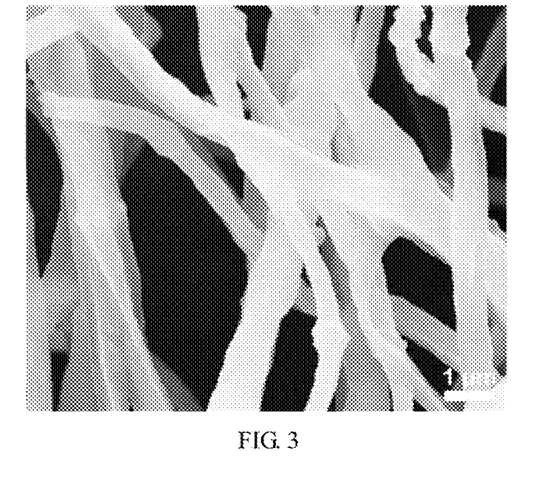
FIG. 3 is a SEM diagram showing the carbonized bacterial cellulose prepared in embodiment 1 of the present invention.

Step 2: the dried bacterial cellulose is placed in a tube furnace with a nitrogen/argon protective atmosphere, and heated to 800° C. at a rate of 5° C./min, and kept at 800° C. for 2 h to obtain carbonized bacterial cellulose. FIG. 3 is the SEM diagram showing the carbonized bacterial cellulose, where the staggered arrangement of tubular hyphae indicates that hyphae is an ideal growth platform for $MoS_2$.

Step 3: 100 mg of the carbonized bacterial cellulose is dispersed into 70 mL of deionized water under an ultrasonic treatment; 0.5 mmol of thiourea and 2.5 mmol of $Na_2MoO_4 \cdot 2H_2O$ are added and dissolved under the ultrasonic treatment to obtain a reaction mixture. The reaction mixture is transferred into a Teflon-lined stainless steel autoclave, and kept at 200° C. for 12 h. After being cooled naturally, a $BC-MoS_2$ heterojunction is collected by a centrifugation.

Figure 1:
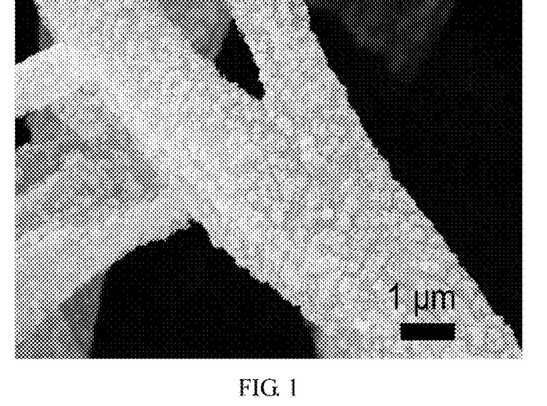
FIG. 1 is a scanning electron microscopy (SEM) diagram showing the $BC-MoS_{2-x}$ heterojunction prepared in embodiment 1 of the present invention.
Figure 2:
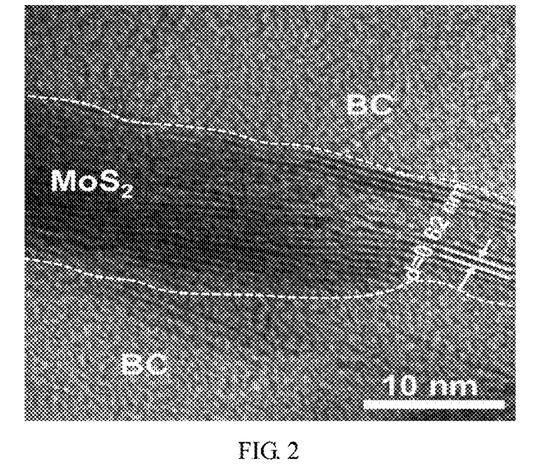
FIG. 2 is a high resolution transmission electron microscopy (HRTEM) diagram showing the $BC-MoS_{2-x}$ heterojunction prepared in embodiment 1 of the present invention.
Figure 4:
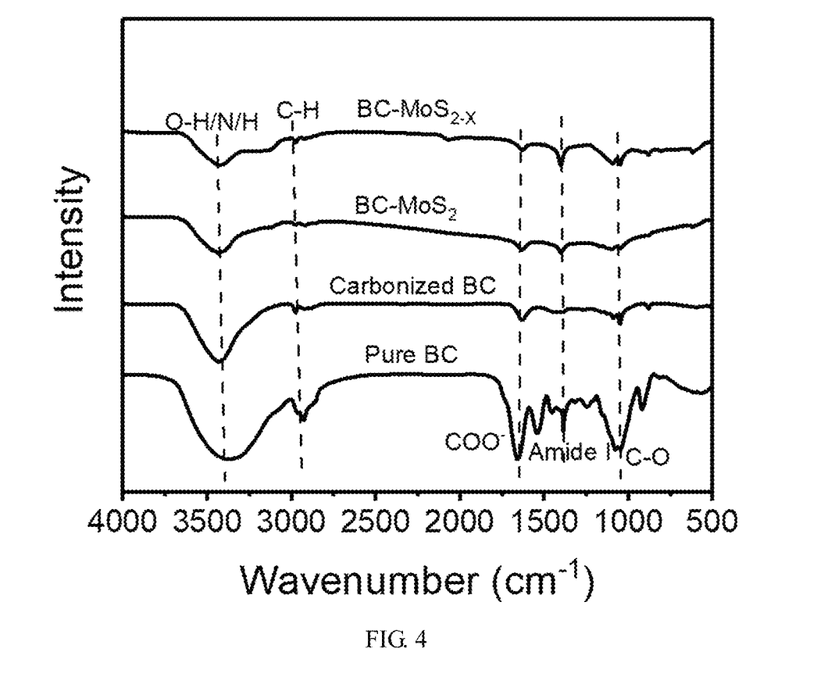
FIG. 4 is a diagram showing Fourier transform infrared spectroscopy (FTIR) spectra of the bacterial cellulose, the carbonized bacterial cellulose, the $BC-MoS_2$ heterojunction and the $BC-MoS_{2-x}$ heterojunction prepared in embodiment 1 of the present invention.
Figure 5:
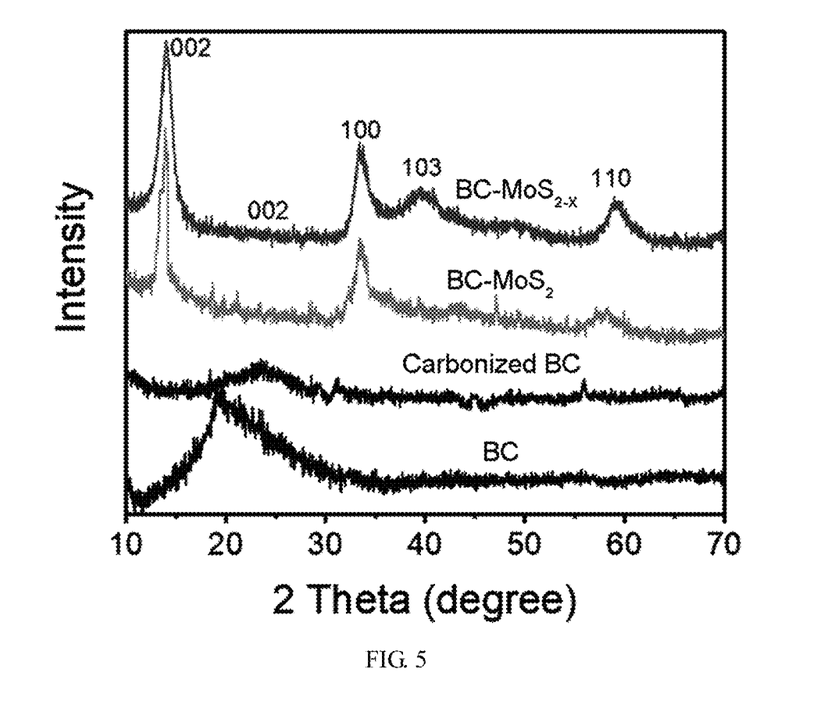
FIG. 5 is a diagram showing X-ray diffraction (XRD) patterns of the bacterial cellulose, the carbonized bacterial cellulose, the $BC-MoS_2$ heterojunction and the $BC-MoS_{2-x}$ heterojunction prepared in embodiment 1 of the present invention.
Figure 6:
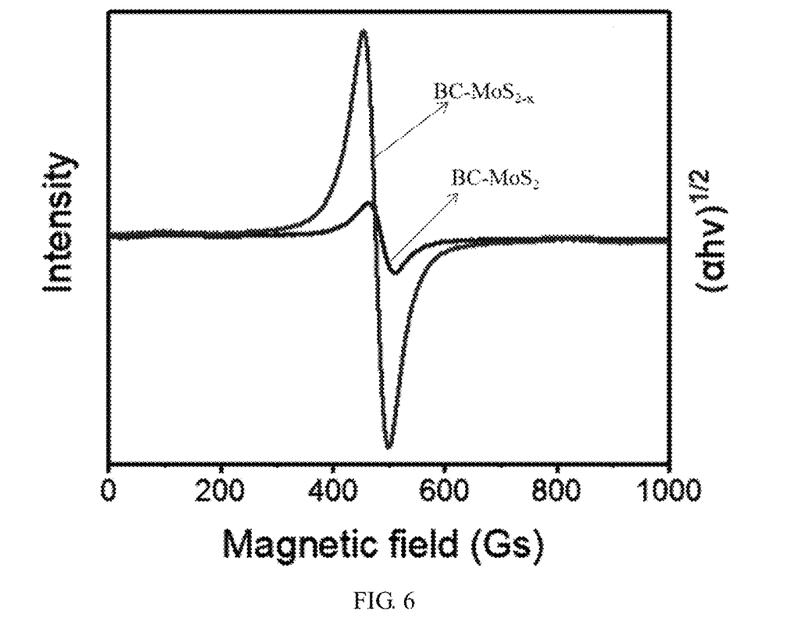
FIG. 6 is a diagram showing electron paramagnetic resonance (EPR) spectra of the $BC-MoS_2$ heterojunction and the $BC-MoS_{2-x}$ heterojunction prepared in embodiment 1 of the present invention.
Figure 17:
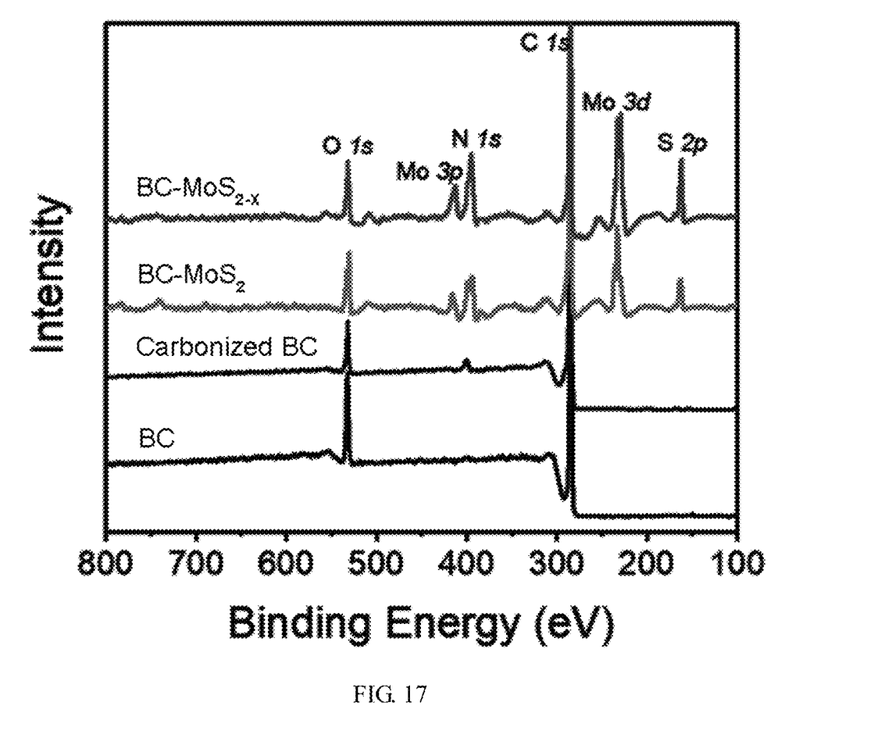
FIG. 17 is a diagram showing XPS spectra of the bacterial cellulose, the carbonized bacterial cellulose, the $BC-MoS_2$ heterojunction and the $BC-MoS_{2-x}$ heterojunction prepared in embodiment 1.
Figure 18:
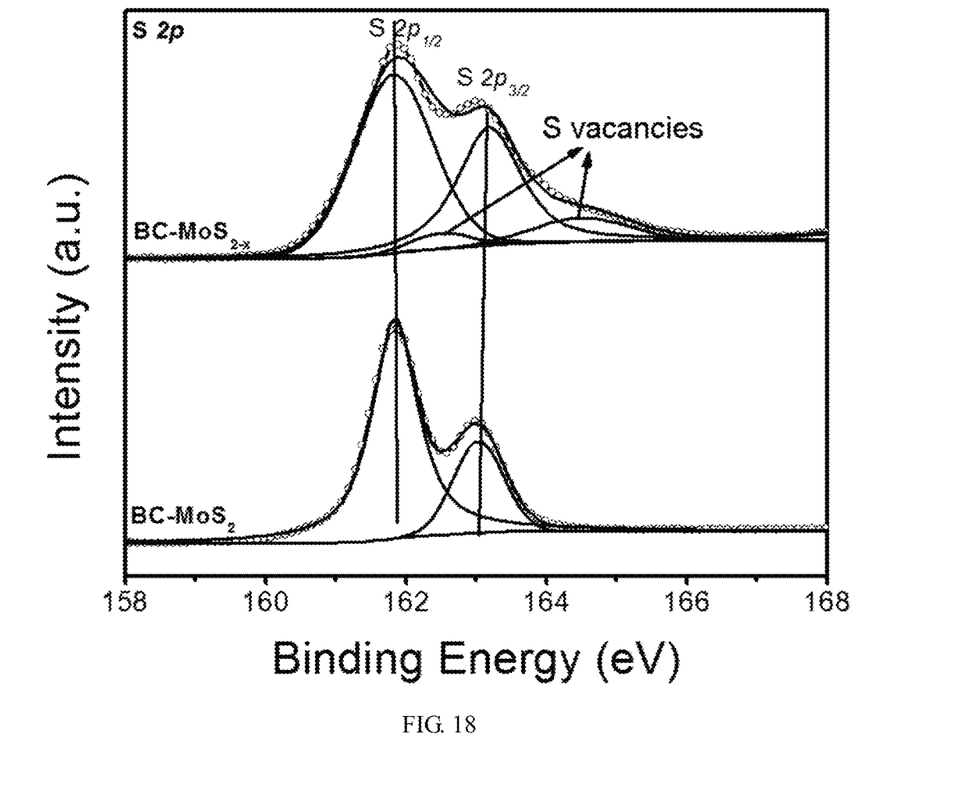
FIG. 18 is a diagram showing XPS spectra (S 2p) of the $BC-MoS_2$ heterojunction and the $BC-MoS_{2-x}$ heterojunction prepared in embodiment 1.

Step 4: the $BC-MoS_2$ heterojunction is placed in a tube furnace with an $Ar/H_2$ atmosphere, heated to 300° C. at a rate of 10° C./min, and kept at 300° C. for 30 min, and cooled naturally to obtain the $BC-MoS_{2-x}$ heterojunction. FIG. 1 shows the SEM diagram of the $BC-MoS_{2-x}$ heterojunction, where the dense $MoS_2$ nanoparticles are uniformly dispersed on the mycelium skeleton. FIG. 2 shows the HRTEM diagram of the $BC-MoS_{2-x}$ heterojunction, indicating distinct lattice fringes with an interplanar spacing of 0.62 nm. FIG. 4 shows the FTIR diagrams of the bacterial cellulose, the carbonized bacterial cellulose, the $BC-MoS_2$ heterojunction and the $BC-MoS_{2-x}$ heterojunction. The $BC-MoS_{2-x}$ heterojunction retains several typical characteristic peaks corresponding to —OH, —OH from carboxyl, —C=O (amide I), —CO, and —COOH respectively, thus providing a basis for the effective removal of U(VI). FIG. 5 shows the XRD patterns of the bacterial cellulose, the carbonized bacterial cellulose, the $BC-MoS_2$ heterojunction and the $BC-MoS_{2-x}$ heterojunction. The $BC-MoS_{2-x}$ heterojunction has seven broad peaks at 13.98°, 33.48°, 39.61°, and 59.21°, corresponding to (002), (100), (103), and (110) facets of $2H-MoS_2$ (JCPDS card No. 75-1539), respectively. In addition, a weak diffraction peak at $2\theta=23.51°$ is ascribed to the (002) facet of graphene, which indicates the graphitization of bacterial cellulose. FIG. 6 shows the EPR spectra of the $BC-MoS_2$ heterojunction and the $BC-MoS_{2-x}$ heterojunction. In order to further verify the details of features of the vacancy in the $BC-MoS_2/BC-MoS_{2-x}$ heterojunctions, the EPR analysis is performed on the $BC-MoS_2/BC-MoS_{2-x}$ heterojunctions. As shown in FIG. 6, the $BC-MoS_2$ heterojunction exhibits a weak electron spin resonance (ESR) signal at 3514 G, indicating a low concentration of natural S-vacancies. However, the $BC-MoS_{2-x}$ heterojunction shows a strong ESR signal, which is caused by the charge state of anion vacancies in $MoS_2$ after $H_2/Ar$ mixed treatment. The above results show that $H_2/Ar$ mixed high-temperature treatment is a feasible way to introduce anion vacancies. FIG. 17 shows the XPS spectra of the bacterial cellulose, the carbonized bacterial cellulose, the $BC-MoS_2$ heterojunction and the $BC-MoS_{2-x}$ heterojunction. The wide-scan XPS spectra of $BC-MoS_{2-x}$ heterojunction show the C 1s, N 1s, O 1s, S 2p, and Mo 3d peaks at 285.2, 393.8, 530.1, 161.6, and 232.3 eV, respectively. Compared with the pure BC, obvious signals of N 1s, Mo 3d and S 2p are observed on the carbonized BC, the $BC-MoS_2$ and the $BC-MoS_{2-x}$ heterojunctions. FIG. 18 shows the XPS spectra (S 2p) of the $BC-MoS_2$ heterojunction and the $BC-MoS_{2-x}$ heterojunction prepared in embodiment 1. The S 2p XPS spectrum shows two main characteristic peaks at 162.8±0.1 eV and 161.6±0.1 eV, which are attributed to the S $2p_{1/2}$ and S $2p_{3/2}$ of $S^{2-}$, respectively. Compared with the $BC-MoS_2$ heterojunction, the two peaks of the $BC-MoS_{2-x}$ heterojunction are located at 162.5±0.1 and 161.4±0.1 eV, corresponding to S vacancies near the S $2p_{1/2}$ and S $2p_{3/2}$, respectively.

Embodiment 2

A preparation method of a bacterial cellulose-defective molybdenum disulfide ($BC-MoS_{2-x}$) heterojunction material for treating radioactive wastewater includes the following steps.

Step 1: a liquid culture medium (per 150 mL) is prepared by dissolving and evenly mixing 5 wt % D-glucose, 0.5 wt % yeast extract, 0.2 wt % disodium hydrogen phosphate, 0.5 wt % peptone, 0.1 wt % citric acid, 0.1 wt % potassium dihydrogen phosphate and water, adjusting a pH value to 6.8, and performing a sterilization under a vapor pressure of 103.4 kPa and a temperature of 120° C. for 20 min. Acetobacter xylinum is inoculated in the liquid culture medium and placed in a constant temperature incubator, incubated for 7 days at 293 K with a shaking speed of 120 rpm, and then rinsed to neutral with deionized water. A freeze-drying is performed to obtain dried bacterial cellulose. The Acetobacter xylinum is inoculated in the liquid culture medium according to a volume fraction of 6%.

Step 2: the dried bacterial cellulose is placed in a tube furnace with a nitrogen/argon protective atmosphere, and heated to 850° C. at a rate of 5° C./min, and kept at 850° C. for 2.5 h to obtain carbonized bacterial cellulose.

Step 3: 100 mg of the carbonized bacterial cellulose is dispersed into 80 mL of deionized water under an ultrasonic treatment; 0.5 mmol of thiourea and 2.5 mmol of $Na_2MoO_4 \cdot 2H_2O$ are added and dissolved under the ultrasonic treatment to obtain a reaction mixture. The reaction mixture is transferred into a Teflon-lined stainless steel autoclave, and kept at 230° C. for 12 h. After being cooled naturally, a $BC-MoS_2$ heterojunction is collected by a centrifugation.

Step 4: the $BC-MoS_2$ heterojunction is placed in a tube furnace with an $Ar/H_2$ atmosphere, heated to 300° C. at a rate of 5° C./min, and kept at 300° C. for 45 min, and cooled naturally to obtain the $BC-MoS_{2-x}$ heterojunction.

Embodiment 3

A preparation method of a bacterial cellulose-defective molybdenum disulfide ($BC-MoS_{2-x}$) heterojunction material for treating radioactive wastewater includes the following steps.

Step 1: a liquid culture medium (per 150 mL) is prepared by dissolving and evenly mixing 5 wt % D-glucose, 0.5 wt % yeast extract, 0.2 wt % disodium hydrogen phosphate, 0.5 wt % peptone, 0.1 wt % citric acid, 0.1 wt % potassium dihydrogen phosphate and water, adjusting a pH value to 6.8, and performing a sterilization under a vapor pressure of 103.4 kPa and a temperature of 120° C. for 20 min. Acetobacter xylinum is inoculated in the liquid culture medium and placed in a constant temperature incubator, incubated for 7 days at 293 K with a shaking speed of 120 rpm, and then rinsed to neutral with deionized water. A freeze-drying is performed to obtain dried bacterial cellulose. The *Acetobacter xylinum* is inoculated in the liquid culture medium according to a volume fraction of 5%.

Step 2: the dried bacterial cellulose is placed in a tube furnace with a nitrogen/argon protective atmosphere, and heated to 800° C. at a rate of 5° C./min, and kept at 800° C. for 3 h to obtain carbonized bacterial cellulose.

Step 3: 10 g of the carbonized bacterial cellulose is dispersed into 6,000 mL of deionized water under an ultrasonic treatment; 4 g of thiourea and 60 g of $Na_2MoO_4.2H_2O$ are added and dissolved under the ultrasonic treatment to obtain a reaction mixture. The reaction mixture is transferred into a Teflon-lined stainless steel autoclave, and kept at 230° C. for 12 h; after being cooled naturally, a $BC-MoS_2$ heterojunction is collected by a centrifugation.

Step 4: the $BC-MoS_2$ heterojunction is placed in a tube furnace with an $Ar/H_2$ atmosphere, heated to 300° C. at a rate of 5° C./min, and kept at 300° C. for 45 min, and cooled naturally to obtain the $BC-MoS_{2-x}$ heterojunction.

Embodiment 4

A preparation method of a bacterial cellulose-defective molybdenum disulfide ($BC-MoS_{2-x}$) heterojunction material for treating radioactive wastewater includes the following steps.

Step 1: a liquid culture medium (per 150 mL) is prepared by dissolving and evenly mixing 5 wt % D-glucose, 0.5 wt % yeast extract, 0.2 wt % disodium hydrogen phosphate, 0.5 wt % peptone, 0.1 wt % citric acid, 0.1 wt % potassium dihydrogen phosphate and water, adjusting a pH value to 6.8, and performing a sterilization under a vapor pressure of 103.4 kPa and a temperature of 120° C. for 20 min. *Acetobacter xylinum* is inoculated in the liquid culture medium and placed in a constant temperature incubator, incubated for 7 days at 293 K with a shaking speed of 120 rpm, and then rinsed to neutral with deionized water. A freeze-drying is performed to obtain dried bacterial cellulose. The *Acetobacter xylinum* is inoculated in the liquid culture medium according to a volume fraction of 5%.

Step 2: the dried bacterial cellulose is placed in a tube furnace with a nitrogen/argon protective atmosphere, and heated to 800° C. at a rate of 5° C./min, and kept at 800° C. for 3 h to obtain carbonized bacterial cellulose. The carbonized bacterial cellulose is subjected to a pretreatment as follows: the carbonized bacterial cellulose is laid on a bottom plate of a low-temperature plasma generator with a thickness of 12 mm; a spacing between two plates of the low-temperature plasma generator is adjusted to 65 mm; an internal air pressure of the low-temperature plasma generator is controlled to 1,000 Pa, then a gas is introduced into the low-temperature plasma generator. A working voltage and current between the two plates of the low-temperature plasma generator are adjusted to 200 V and 1.2 A, and the pretreatment is performed for 45 min to obtain pretreated carbonized bacterial cellulose. The gas is carbon dioxide.

Step 3: 10 g of the pretreated carbonized bacterial cellulose is dispersed into 6,000 mL of deionized water under an ultrasonic treatment; 4 g of thiourea and 60 g of $Na_2MoO_4.2H_2O$ are added and dissolved under the ultrasonic treatment to obtain a reaction mixture, the reaction mixture is transferred into a Teflon-lined stainless steel autoclave, and kept at 230° C. for 12 h; after being cooled naturally, a $BC-MoS_2$ heterojunction is collected by a centrifugation.

Step 4: the $BC-MoS_2$ heterojunction is placed in a tube furnace with an $Ar/H_2$ atmosphere, heated to 300° C. at a rate of 5° C./min, and kept at 300° C. for 45 min, and cooled naturally to obtain the $BC-MoS_{2-x}$ heterojunction.

Embodiment 5

A preparation method of a bacterial cellulose-defective molybdenum disulfide ($BC-MoS_{2-x}$) heterojunction material for treating radioactive wastewater includes the following steps.

Step 1: a liquid culture medium (per 150 mL) is prepared by dissolving and evenly mixing 5 wt % D-glucose, 0.5 wt % yeast extract, 0.2 wt % disodium hydrogen phosphate, 0.5 wt % peptone, 0.1 wt % citric acid, 0.1 wt % potassium dihydrogen phosphate and water, adjusting a pH value to 6.8, and performing a sterilization under a vapor pressure of 103.4 kPa and a temperature of 120° C. for 20 min. *Acetobacter xylinum* is inoculated in the liquid culture medium and placed in a constant temperature incubator, incubated for 7 days at 293 K with a shaking speed of 120 rpm, and then rinsed to neutral with deionized water. A freeze-drying is performed to obtain dried bacterial cellulose. The *Acetobacter xylinum* is inoculated in the liquid culture medium according to a volume fraction of 5%.

Step 2: the dried bacterial cellulose is placed in a tube furnace with a nitrogen/argon protective atmosphere, and heated to 800° C. at a rate of 5° C./min, and kept at 800° C. for 3 h to obtain carbonized bacterial cellulose. The carbonized bacterial cellulose is subjected to a pretreatment as follows: the carbonized bacterial cellulose is laid on a bottom plate of a low-temperature plasma generator with a thickness of 12 mm. A spacing between two plates of the low-temperature plasma generator is adjusted to 65 mm; an internal air pressure of the low-temperature plasma generator is controlled to 1,000 Pa, then a gas is introduced into the low-temperature plasma generator. A working voltage and current between the two plates of the low-temperature plasma generator is adjusted to 200 V and 1.2 A, and the pretreatment is performed for 45 min to obtain pretreated carbonized bacterial cellulose. The gas is carbon dioxide.

Step 3: 10 g of the pretreated carbonized bacterial cellulose is added into a ball mill, 4 g of thiourea and 60 g of $Na_2MoO_4.2H_2O$ are added simultaneously, liquid nitrogen is introduced into the ball mill to immerse all the materials in the liquid nitrogen, and a liquid level is kept stable; a ball milling is performed after a constant temperature is kept for 25 min, and the temperature in the ball mill is −175° C.; the milled materials are placed at 60° C. for 120 min. The milled materials are dispersed into 6,000 mL of deionized water under an ultrasonic treatment to obtain a reaction mixture, the reaction mixture is transferred into a Teflon-lined stainless steel autoclave, and kept at 230° C. for 12 h; after being cooled naturally, a $BC-MoS_2$ heterojunction is collected by a centrifugation.

Step 4: the $BC-MoS_2$ heterojunction is placed in a tube furnace with an $Ar/H_2$ atmosphere, heated to 300° C. at a rate of 5° C./min, and kept at 300° C. for 45 min, and cooled naturally to obtain the $BC-MoS_{2-x}$ heterojunction.

Embodiment 6

A preparation method of a bacterial cellulose-defective molybdenum disulfide ($BC-MoS_{2-x}$) heterojunction material for treating radioactive wastewater includes the following steps.

Step 1: a liquid culture medium (per 150 mL) is prepared by dissolving and evenly mixing 5 wt % D-glucose, 0.5 wt % yeast extract, 0.2 wt % disodium hydrogen phosphate, 0.5 wt % peptone, 0.1 wt % citric acid, 0.1 wt % potassium dihydrogen phosphate and water, adjusting a pH value to 6.8, and performing a sterilization under a vapor pressure of 103.4 kPa and a temperature of 120° C. for 20 min. *Acetobacter xylinum* is inoculated in the liquid culture medium and placed in a constant temperature incubator, incubated for 7 days at 293 K with a shaking speed of 120 rpm, and then rinsed to neutral with deionized water. A freeze-drying is performed to obtain dried bacterial cellulose. The *Acetobacter xylinum* is inoculated in the liquid culture medium according to a volume fraction of 5%.

Step 2: the dried bacterial cellulose is placed in a tube furnace with a nitrogen/argon protective atmosphere, and heated to 800° C. at a rate of 5° C./min, and kept at 800° C. for 3 h to obtain carbonized bacterial cellulose.

Step 3: 10 g of the carbonized bacterial cellulose is added into a ball mill, 4 g of thiourea and 60 g of $Na_2MoO_4.2H_2O$ are added simultaneously, liquid nitrogen is introduced into the ball mill to immerse all the materials in the liquid nitrogen, and a liquid level is kept stable. A ball milling is performed after a constant temperature is kept for 25 min, and the temperature in the ball mill is −175° C.; the milled materials are placed at 60° C. for 120 min. The milled materials are dispersed into 6,000 mL of deionized water under an ultrasonic treatment to obtain a reaction mixture, the reaction mixture is transferred into a Teflon-lined stainless steel autoclave, and kept at 230° C. for 12 h; after being cooled naturally, a $BC-MoS_2$ heterojunction is collected by a centrifugation.

Step 4: the $BC-MoS_2$ heterojunction is placed in a tube furnace with an $Ar/H_2$ atmosphere, heated to 300° C. at a rate of 5° C./min, and kept at 300° C. for 45 min, and cooled naturally to obtain the $BC-MoS_{2-x}$ heterojunction.

Figure 7:
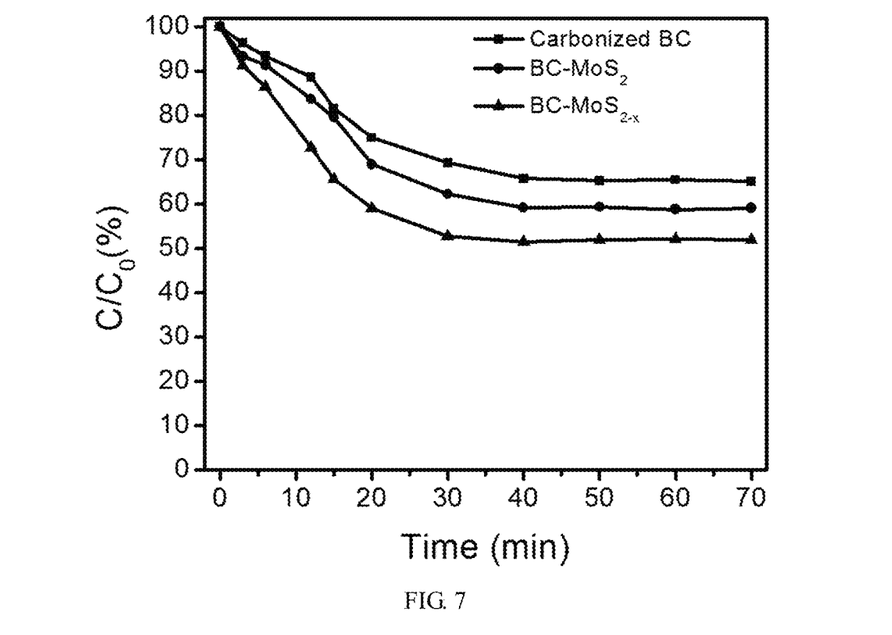
FIG. 7 is a diagram showing adsorption kinetic curves (under dark conditions) of U(VI) by the carbonized bacterial cellulose, the $BC-MoS_2$ heterojunction and the $BC-MoS_{2-x}$ heterojunction prepared in embodiment 1 of the present invention.
Figure 8:
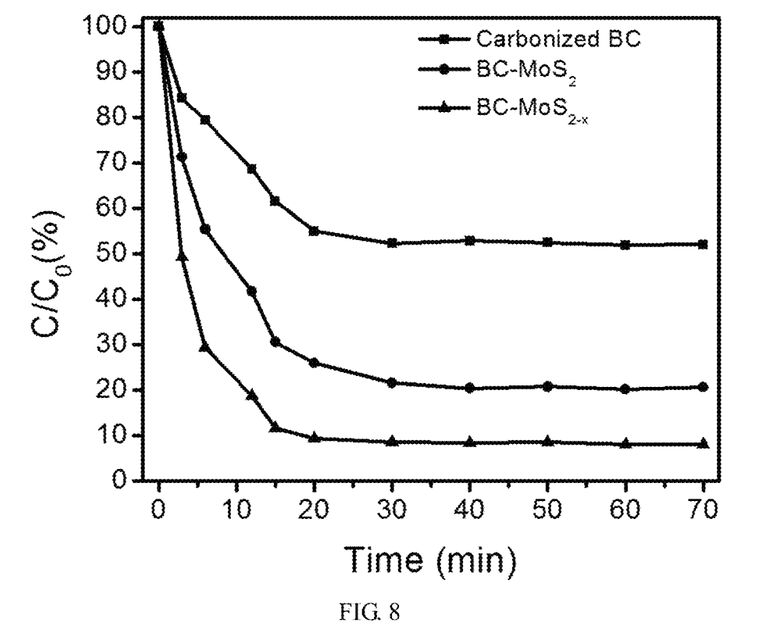
FIG. 8 is a diagram showing adsorption kinetic curves (under sunlight conditions) of U(VI) by the carbonized bacterial cellulose, the $BC-MoS_2$ heterojunction and the $BC-MoS_{2-x}$ heterojunction prepared in embodiment 1 of the present invention.
Figure 9:
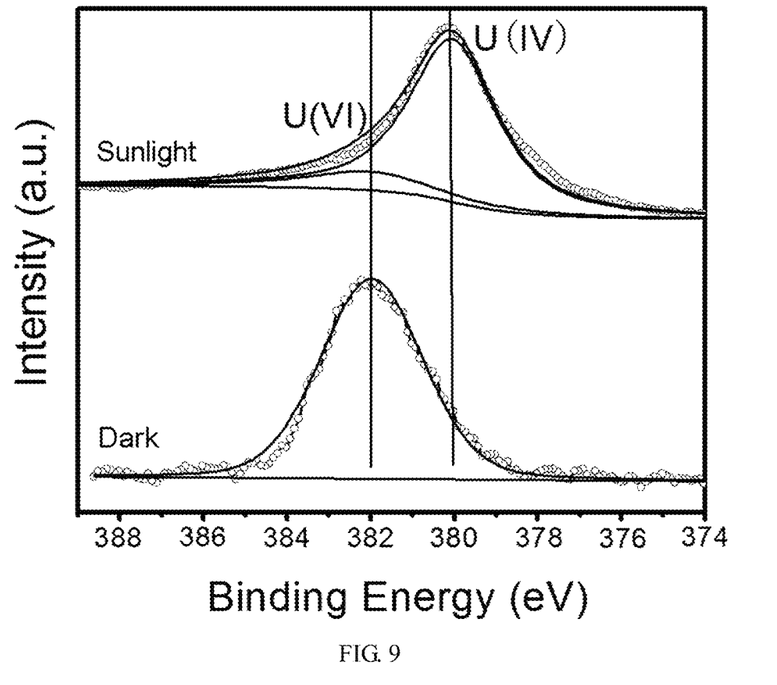
FIG. 9 is a diagram showing X-ray photoelectron spectroscopy (XPS) spectra of the $BC-MoS_{2-x}$ heterojunction (prepared in embodiment 1) in U 4f region under dark conditions and simulated sunlight irradiation.

The adsorption-catalytic reduction experiment of U(VI) is carried out on the carbonized bacterial cellulose. The $BC-MoS_2$ heterojunction and the $BC-MoS_{2-x}$ heterojunction prepared in embodiment 1.5 mg of samples (carbonized bacterial cellulose, $BC-MoS_2$ heterojunction, and $BC-MoS_{2-x}$ heterojunction) are added into a 20 mL glass bottle containing 10 mL of U(VI) solution (8 mg/L, pH=5.0), respectively. The simulated sunlight is irradiated on the glass bottle from a 300-W Xe lamp with AM 1.5G filter (BL-GHX-V, China). A stirring is performed at 20° C. with a speed of 600 r/min, and the performance of the materials is characterized by measuring the concentrations of U(VI) in the solutions after different reaction time. Meanwhile, the same adsorption-catalytic reduction experiment of U(VI) is carried out under dark conditions. The U(VI) solution is prepared by uranyl nitrate. The concentrations of U(VI) in the solution before and after adsorption are determined by a double-beam UV-Vis spectrophotometer. All the experiments are performed in triplicate to take an average value. FIG. 7 shows the experimental results under dark conditions. FIG. 8 shows the experimental results under simulated sunlight irradiation conditions. FIG. 7 shows that the carbonized bacterial cellulose exhibits a relatively low U(VI) extraction capacity with a removal rate of only 34.9% under the dark conditions, while the removal rate of U(VI) by the $BC-MoS_2$ and $BC-MoS_{2-x}$ heterojunctions are 40.9% and 48.1%, respectively, which are slightly higher than that of the carbonized bacterial cellulose. The results are ascribed to the electron transfer from $MoS_2/MoS_{2-x}$ to the carbonized bacterial cellulose, thereby improving the adsorption of U(VI). As shown in FIG. 8, the U(VI) extraction capacity of the carbonized bacterial cellulose is substantially unchanged during the introduction of simulated sunlight into the reaction system. However, the $BC-MoS_2$ heterojunction exhibits a promoted adsorption kinetics and the U(VI) extraction efficiency up to 79.3%. The above results confirm that the construction of heterojunctions effectively enhances the U(VI) extraction capability. Compared with the $BC-MoS_2$ heterojunction, the $BC-MoS_{2-x}$ heterojunction shows excellent U(VI) extraction ability with the introduction of S-vacancies, and the removal rate is up to 91.8%. The above results show that the integration of Schottky junction and vacancies provides a feasible strategy to promote photoelectron transfer, thus improving the U(VI) extraction capability. In order to prove that the integration of Schottky junction and S-vacancies enhances the photocatalytic reduction of U(VI), the changes of uranium species on the $BC-MoS_{2-x}$ heterojunction under dark and sunlight conditions are further compared. In the U 4f XPS spectra, the presence of U(IV) and U(VI) species on the $BC-MoS_{2-x}$ heterojunction after U(IV) extraction confirms the reduction of U(VI), while U(IV) is absent under the dark conditions (as shown in FIG. 9). The results show that the integration of Schottky junction and S-vacancies enhances the photocatalytic reduction ability of the heterojunctions.

Figure 10:
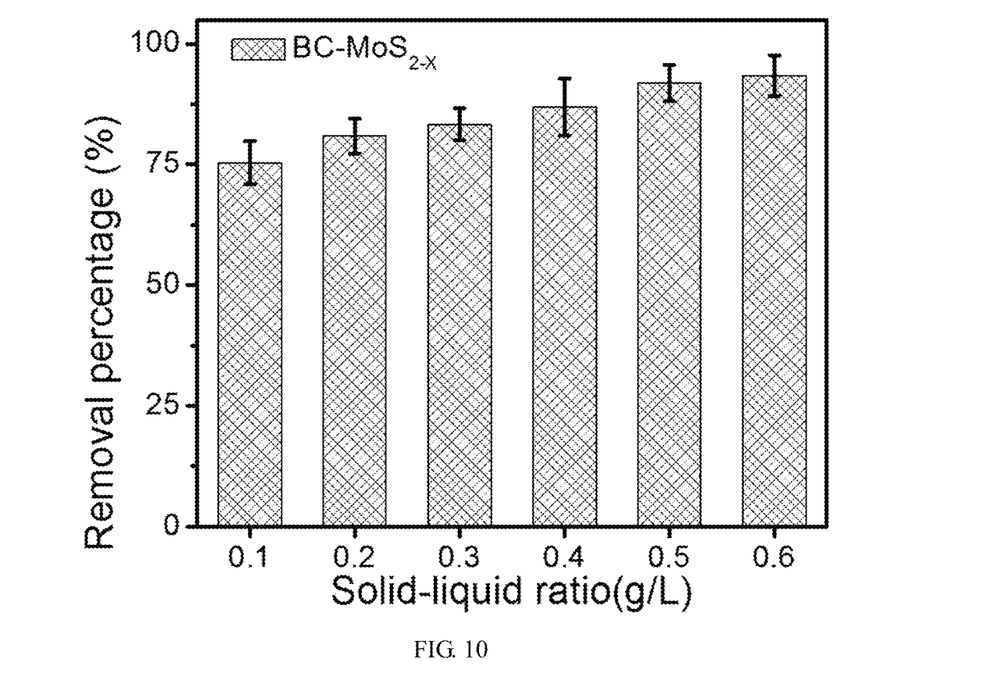
FIG. 10 is a diagram showing adsorption effects of the $BC-MoS_{2-x}$ heterojunction prepared in embodiment 1 on U(VI) (different addition amounts of the $BC-MoS_{2-x}$ heterojunction)

The adsorption-catalytic reduction experiment of U(VI) is carried out on the $BC-MoS_{2-x}$ heterojunction prepared in embodiment 1. 1 mg, 2 mg, 3 mg, 4 mg and 5 mg of samples ($BC-MoS_{2-x}$ heterojunction) are added into a 20 mL glass bottle containing 10 mL of U(VI) solution (8 mg/L, pH=5.0), respectively. The simulated sunlight is irradiated on the glass bottle from a 300-W Xe lamp with AM 1.5G filter (BL-GHX-V, China). A stirring is performed at 20° C. with a speed of 600 r/min for 60 min, and the concentrations of U(VI) in the solution before and after adsorption are measured to calculate removal rates. Removal rate=$(C_0-C_t)/C_0\times100\%$, where $C_0$ is an initial concentration and $C_t$ is a concentration after adsorption. The U(VI) solution is prepared by uranyl nitrate, and the concentrations of U(VI) in the solution before and after adsorption are determined by the double-beam UV-Vis spectrophotometer. All the experiments are performed in triplicate to take an average value. The results are shown in FIG. 10. With the increase of the solid-liquid ratio, the maximum extraction rate of U(VI) by the $BC-MoS_{2-x}$ heterojunction reaches 94%.

Figure 11:
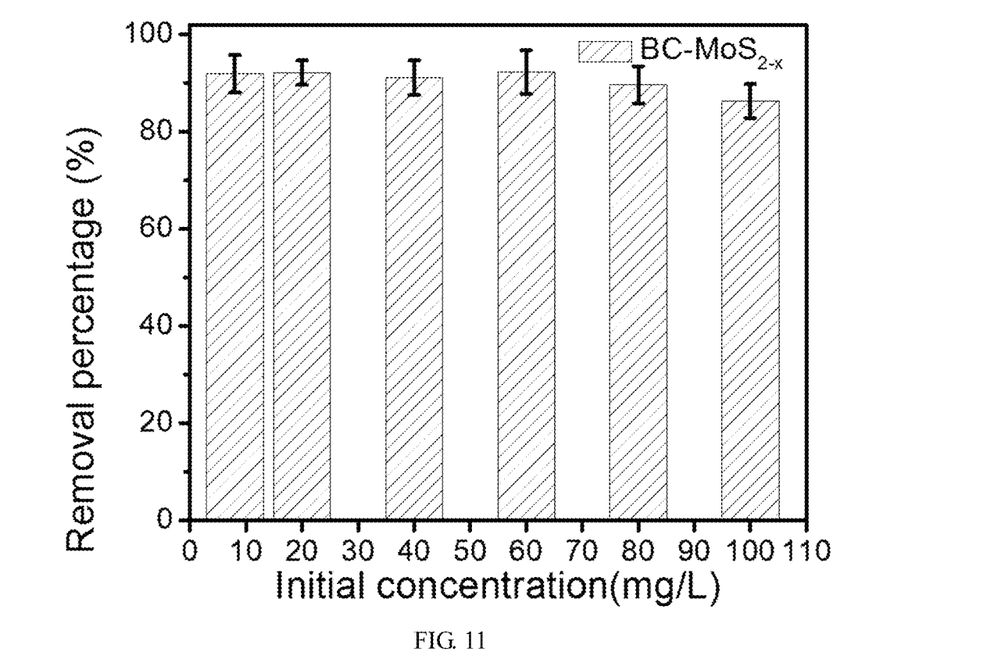
FIG. 11 is a diagram showing adsorption effects of the $BC-MoS_{2-x}$ heterojunction prepared in embodiment 1 on U(VI) (different initial concentrations of the U(VI))

5 mg of samples prepared by embodiment 1 ($BC-MoS_{2-x}$ heterojunction) are added into a 20 mL glass bottle containing 10 mL of U(VI) solution ($C_{U(VI)}$=8 ppm, 20 ppm, 40 ppm, 60 ppm, 80 ppm and 100 ppm, pH=5.0), respectively. The simulated sunlight is irradiated on the glass bottle from a 300-W Xe lamp with AM 1.5G filter (BL-GHX-V, China). A stirring is performed at 20° C. with a speed of 600 r/min for 60 min, and the concentrations of U(VI) in the solution before and after adsorption are measured. The U(VI) solution is prepared by uranyl nitrate, and the concentrations of U(VI) in the solution before and after adsorption are determined by the double-beam UV-Vis spectrophotometer. All the experiments are performed in triplicate to take an average value. The results are shown in FIG. 11. The $BC-MoS_{2-x}$ heterojunction maintains a high removal rate of U(VI) over a wide range of U(VI) concentrations.

Figure 16:
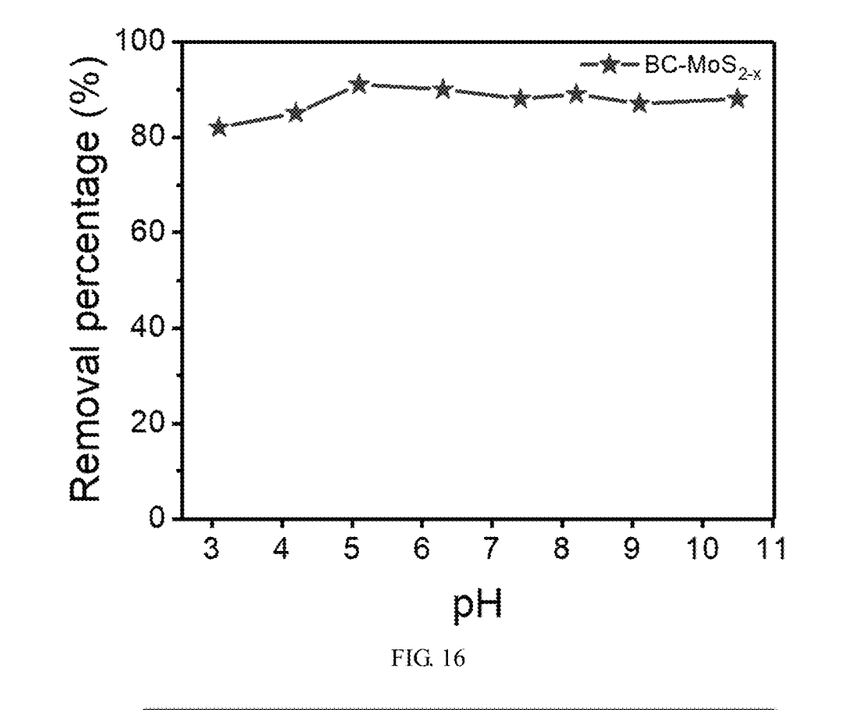
FIG. 16 is a diagram showing adsorption effects of the $BC-MoS_{2-x}$ heterojunction prepared in embodiment 1 on U(VI) (under different pH conditions)

The adsorption-catalytic reduction experiment of U(VI) is carried out on the $BC-MoS_{2-x}$ heterojunction prepared in embodiment 1. 5 mg of samples ($BC-MoS_{2-x}$ heterojunction) are added into a 20 mL glass bottle containing 10 mL of U(VI) solution ($C_{U(VI)}$=8 ppm, pH=3.1, 4.2, 5.0, 6.3, 7.5, 8.2, 9.1 and 10.5), respectively. The simulated sunlight is irradiated on the glass bottle from a 300-W Xe lamp with AM 1.5G filter (BL-GHX-V, China). A stirring is performed at 20° C. with a speed of 600 r/min for 60 min, and the concentrations of U(VI) in the solution before and after adsorption are measured. The U(VI) solution is prepared by uranyl nitrate, and the concentrations of U(VI) in the solution before and after adsorption are determined by the double-beam UV-Vis spectrophotometer. All the experiments are performed in triplicate to take an average value. The results are shown in FIG. 16. Under various pH conditions, the BC-MoS$_{2-x}$ heterojunction still maintains a high removal efficiency of U(VI).

Figure 12:
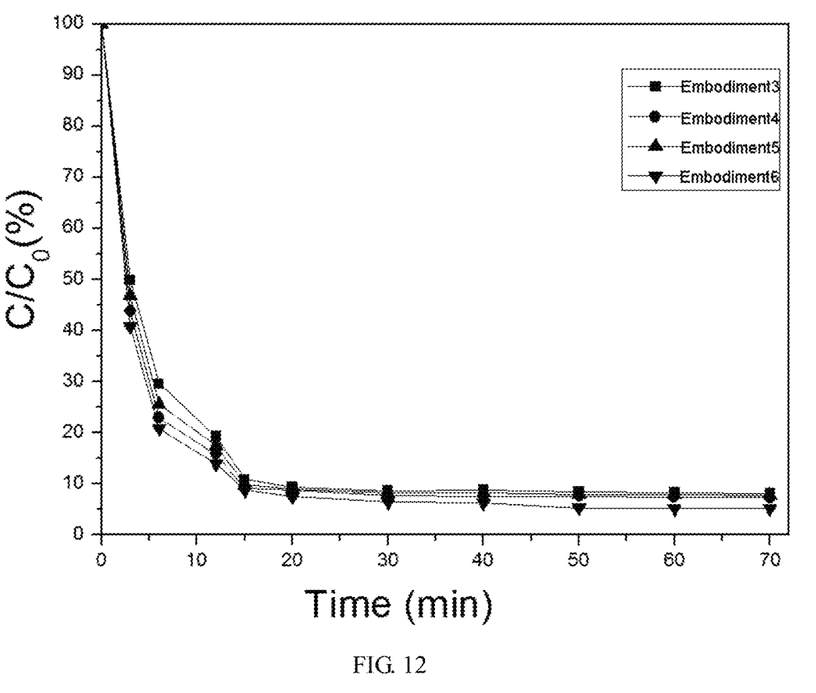
FIG. 12 is a diagram showing adsorption kinetic curves (under sunlight conditions) of U(VI) by the $BC-MoS_{2-x}$ heterojunctions prepared in embodiments 3-6.
Figure 13:
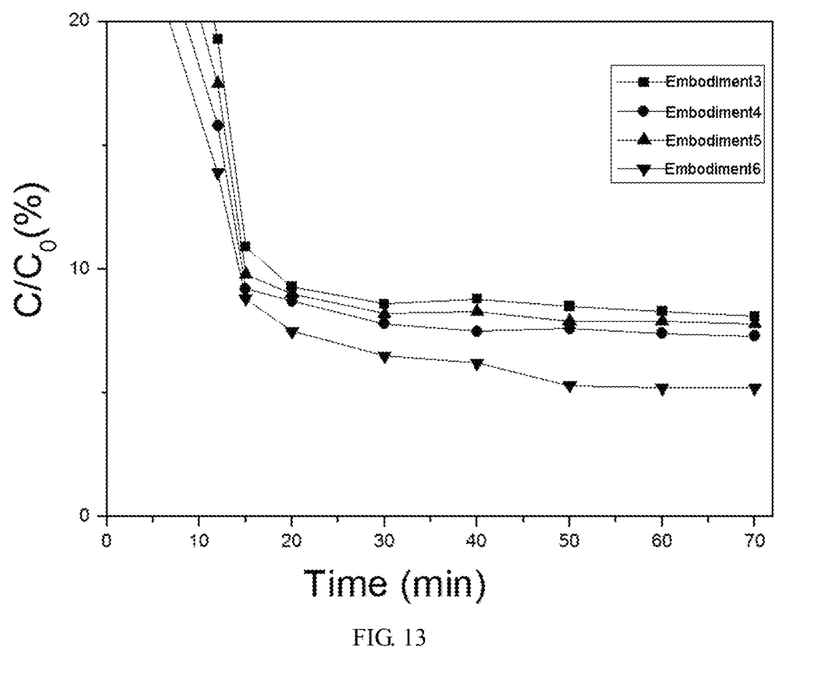
FIG. 13 is a diagram showing partial enlarged curves of FIG. 12.
Figure 14:
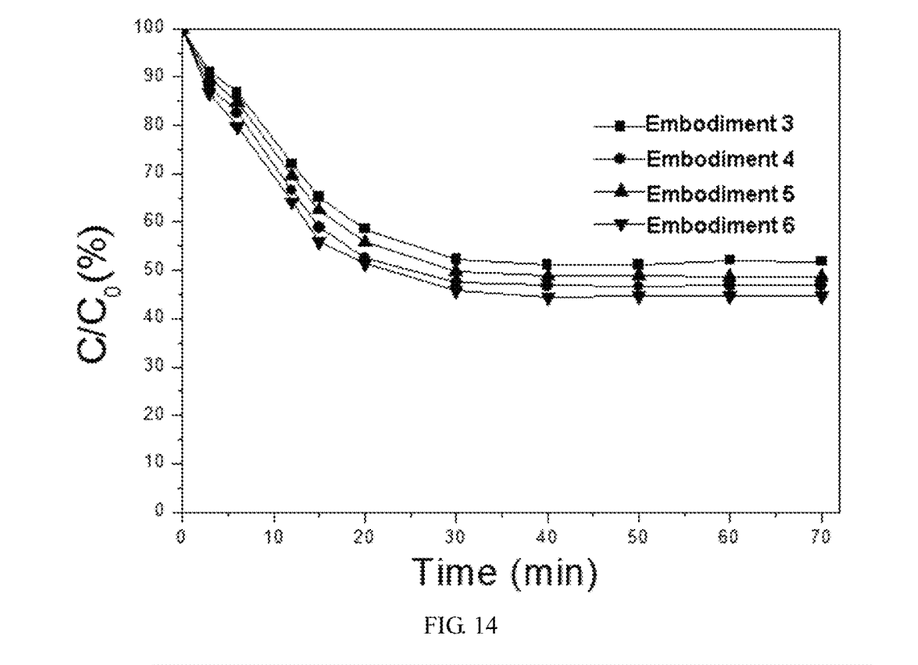
FIG. 14 is a diagram showing adsorption kinetic curves (under dark conditions) of U(VI) by the $BC-MoS_{2-x}$ heterojunctions prepared in embodiments 3-6.

The adsorption-catalytic reduction experiment of U(VI) is carried out on the BC-MoS$_{2-x}$ heterojunctions prepared in embodiments 3-6. 5 mg of samples (BC-MoS$_{2-x}$, heterojunctions prepared in embodiments 3-6) are added into a 20 mL glass bottle containing 10 mL of U(VI) solution (8 mg/L, pH=5.0), respectively. The simulated sunlight is irradiated on the glass bottle from a 300-W Xe lamp with AM 1.5G filter (BL-GHX-V, China). A stirring is performed at 20° C. with a speed of 600 r/min, and the performance of the materials is characterized by measuring the concentrations of U(VI) in the solution after different reaction time. Meanwhile, the same adsorption-catalytic reduction experiment of U(VI) is carried out under dark conditions. The U(VI) solution is prepared by uranyl nitrate. The concentrations of U(VI) in the solution before and after adsorption are determined by the double-beam UV-Vis spectrophotometer. All the experiments are performed in triplicate to take an average value. FIGS. 12 and 13 show the adsorption-catalytic results of the BC-MoS$_{2-x}$ heterojunctions prepared in embodiments 3-6 under sunlight conditions, and FIG. 14 shows the adsorption-catalytic results of the BC-MoS$_{2-x}$ heterojunctions prepared in embodiments 3-6 under dark conditions. As can be seen from FIGS. 12 and 13, the BC-MoS$_{2-x}$ heterojunctions prepared in embodiments 3-6 have better adsorption-catalysis on U(VI). Under sunlight conditions, the removal rate of U(VI) by the BC-MoS$_{2-x}$ heterojunction prepared in embodiment 3 is 91.9%, the removal rate of U(VI) by the BC-MoS$_{2-x}$ heterojunction prepared in embodiment 4 is 92.7%, the removal rate of U(VI) by the BC-MoS$_{2-x}$ heterojunction prepared in embodiment 5 is 92.2%; and the removal rate of U(VI) by the BC-MoS$_{2-x}$ heterojunction prepared in embodiment 6 is 94.8%. It can be seen from FIG. 14 that under dark conditions, the removal rate of U(VI) by the BC-MoS$_{2-x}$ heterojunction prepared in embodiment 3 is 48.2%; the removal rate of U(VI) by the BC-MoS$_{2-x}$ heterojunction prepared in embodiment 4 is 53.2%; the removal rate of U(VI) by the BC-MoS$_{2-x}$ heterojunction prepared in embodiment 5 is 51.3%; and the removal rate of U(VI) by the BC-MoS$_{2-x}$ heterojunction prepared in embodiment 6 is 55.4%.

Figure 15:
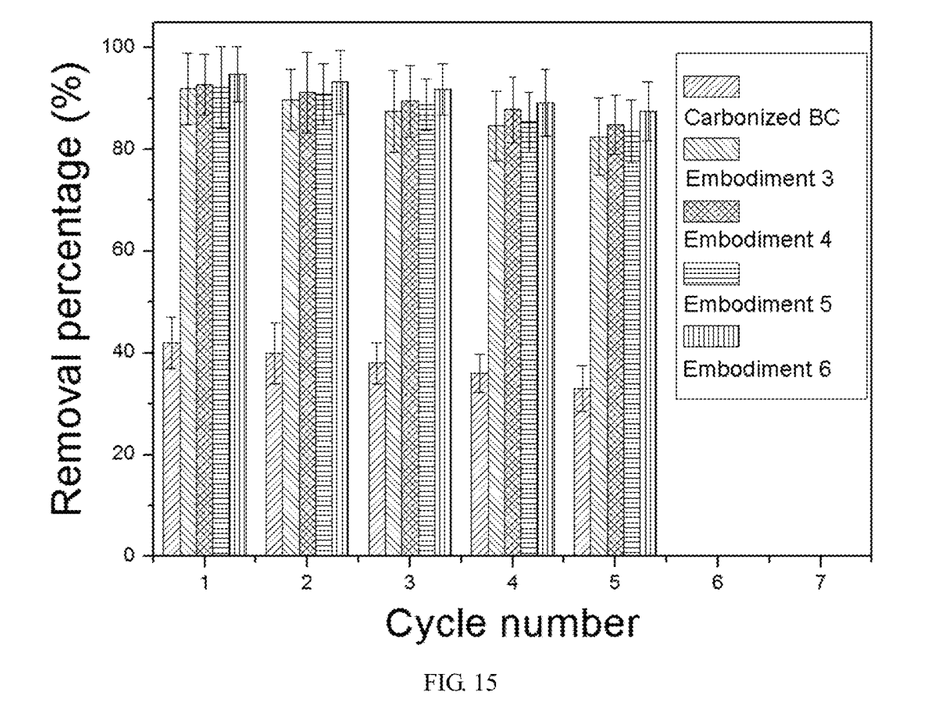
FIG. 15 is a diagram showing cyclic adsorption effects of U(VI) by the $BC-MoS_{2-x}$ heterojunctions and the carbonized bacterial cellulose prepared in embodiments 3-6.

After the adsorption-catalytic reduction experiment of U(VI) is carried out on the BC-MoS$_{2-x}$ heterojunctions and the carbonized BC prepared in embodiments 3-6, the BC-MoS$_{2-x}$ heterojunction loaded with U(VI) is further treated with excessive NaOH or HC; (0.1 mol/L) for 4 h under ultrasonic conditions, and then rinsed with deionized water three times. After being dried, a cyclic adsorption is performed five times. The adsorption process of each time is the same as that of the first time, i.e., 5 mg of samples (BC-MoS$_{2-x}$ heterojunctions and carbonized bacterial cellulose prepared in embodiments 3-6) are added into a 20 mL glass bottle containing 10 mL of U(VI) solution (8 mg/L, pH=5.0), respectively. The simulated sunlight is irradiated on the glass bottle from a 300-W Xe lamp with AM 1.5G filter (BL-GHX-V, China). A stirring is performed at 20° C. with a speed of 600 r/min for 70 min. The U(VI) solution is prepared by uranyl nitrate, and the concentrations of U(VI) in the solution before and after adsorption are determined by the double-beam UV-Vis spectrophotometer. All the experiments are performed in triplicate to take an average value. The results are shown in FIG. 15. After five cycles, the carbonized bacterial cellulose and the BC-MoS$_{2-x}$ heterojunction maintain a relative high removal efficiency of U(VI) without a significant decrease.

Although the implementation modes of the present invention have been disclosed as above, they are not limited to the applications listed in the specification and embodiments. They can be applied to various fields suitable for the present invention. For those skilled in the art, additional modifications can be easily realized. Therefore, without departing from the general concept defined by the claims and equivalent scope thereof, the present invention is not limited to the specific details and the drawings shown and described here.

What is claimed is:

1. A preparation method of a bacterial cellulose-defective molybdenum disulfide (BC-MoS$_{2-x}$) heterojunction material for treating radioactive wastewater, comprising the following steps:
   step 1: preparing a liquid culture medium (per 150 mL) by dissolving and evenly mixing 5 wt % D-glucose, 0.5 wt % yeast extract, 0.2 wt % disodium hydrogen phosphate, 0.5 wt % peptone, 0.1 wt % citric acid, 0.1 wt % potassium dihydrogen phosphate and water, adjusting a pH value to 6.8, and performing a sterilization under a vapor pressure of 103.4 kPa and a temperature of 120-121.3° C. for 15-20 min; inoculating *Acetobacter xylinum* in the liquid culture medium and placing the liquid culture medium with the *Acetobacter xylinum* in a constant temperature incubator, incubating the *Acetobacter xylinum* in the liquid culture medium for 7 days at 293 K with a shaking speed of 120 rpm to obtain an *Acetobacter xylinum*-inoculated culture medium, and then rinsing the *Acetobacter xylinum*-inoculated culture medium to neutral with deionized water to obtain neutral *Acetobacter xylinum;* performing a freeze-drying on the neutral *Acetobacter xylinum* to obtain dried bacterial cellulose; wherein the *Acetobacter xylinum* is inoculated in the liquid culture medium according to a volume fraction of 3-8%;
   step 2: placing the dried bacterial cellulose in a tube furnace with a nitrogen/argon protective atmosphere, and heating the dried bacterial cellulose to 750-850° C. at a rate of 5° C./min, and keeping the dried bacterial cellulose at 750-850° C. for 2-3 h to obtain carbonized bacterial cellulose;
   step 3: dispersing the carbonized bacterial cellulose into deionized water under a first ultrasonic treatment to obtain dispersed carbonized bacterial cellulose; adding thiourea and Na$_2$MoO$_4$.2H$_2$O to the dispersed carbonized bacterial cellulose for a dissolution under the first ultrasonic treatment to obtain a first reaction mixture, transferring the first reaction mixture into a Teflon-lined stainless steel autoclave, and conducting a first heat preservation on the first reaction mixture at 140-230° C. for 12 h; cooling the first reaction mixture naturally to obtain a first cooled reaction mixture, and collecting a bacterial cellulose-MoS$_2$ (BC-MoS$_2$) heterojunction from the first cooled reaction mixture by a first centrifugation;
   step 4: placing the BC-MoS$_2$ heterojunction in a tube furnace with an Ar/H$_2$ atmosphere, heating the BC-MoS$_2$ heterojunction to 300° C. at a rate of 5-10° C./min, keeping the BC-MoS$_2$ heterojunction at 300° C. for 0-200 min, and cooling the BC-MoS$_2$ heterojunction naturally to obtain the BC-MoS$_{2-x}$ heterojunction, wherein 0≤X<2.

2. The preparation method of the BC-MoS$_{2-x}$ heterojunction material for treating the radioactive wastewater according to claim 1, wherein in step 3, a mass ratio of the carbonized bacterial cellulose to the deionized water is 1:600-800, a mass ratio of the carbonized bacterial cellulose to the thiourea is 1:0.3-0.4, and a mass ratio of the thiourea to the Na$_2$MoO$_4$.2H$_2$O is 1:14-17.

3. The preparation method of the BC-MoS$_{2-x}$ heterojunction material for treating the radioactive wastewater according to claim 1, wherein in step 2, the carbonized bacterial cellulose is subjected to a pretreatment as follows: laying the carbonized bacterial cellulose on a bottom plate of a low-temperature plasma generator, wherein a thickness of the carbonized bacterial cellulose after being laid is 6-12 mm; adjusting a spacing between two plates of the low-temperature plasma generator to 25-65 mm; controlling an internal air pressure of the low-temperature plasma generator to 900-1,200 Pa, then introducing a gas into the low-temperature plasma generator; adjusting a working voltage and a current between the two plates of the low-temperature plasma generator to 50-220 V and 0.5-1.2 A, respectively, and treating the carbonized bacterial cellulose for 30-60 min to obtain pretreated carbonized bacterial cellulose.

4. The preparation method of the BC-MoS$_{2-x}$ heterojunction material for treating the radioactive wastewater according to claim 3, wherein the gas is one selected from the group consisting of air, oxygen and carbon dioxide.

5. The preparation method of the BC-MoS$_{2-x}$ heterojunction material for treating the radioactive wastewater according to claim 1, wherein step 3 is replaced by the following step: adding the carbonized bacterial cellulose into a ball mill, and adding the thiourea and the Na$_2$MoO$_4$.2H$_2$O into the ball mill simultaneously to obtain a mixture; introducing liquid nitrogen into the ball mill to immerse the mixture in the liquid nitrogen, and keeping a liquid level of the liquid nitrogen stable; preforming a ball milling on the mixture after keeping a constant temperature for 15-30 min to obtain milled materials, wherein the constant temperature in the ball mill is −155° C. to −180° C.; placing the milled materials at 40-60° C. for 90-120 min; dispersing the milled materials into deionized water under a second ultrasonic treatment to obtain a second reaction mixture, transferring the second reaction mixture into the Teflon-lined stainless steel autoclave, and conducting a second heat preservation on the second reaction mixture at 140-230° C. for 12 h; cooling the second reaction mixture naturally to obtain a second cooled reaction mixture, and collecting the BC-MoS$_2$ heterojunction from the second cooled reaction mixture by a second centrifugation.

6. The preparation method of the BC-MoS$_{2-x}$ heterojunction material for treating the radioactive wastewater according to claim 5, wherein a time of the ball milling is 60-90 min, and a speed of the ball milling is 500-650 rpm.

7. The preparation method of the BC-MoS$_{2-x}$ heterojunction material for treating the radioactive wastewater according to claim 5, wherein in step 3, a mass ratio of the carbonized bacterial cellulose to the deionized water is 1:600-800, a mass ratio of the carbonized bacterial cellulose to the thiourea is 1:0.3-0.4, and a mass ratio of the thiourea to the Na$_2$MoO$_4$.2H$_2$O is 1:14-17.

* * * * *